United States Patent Office 3,092,972
Patented June 11, 1963

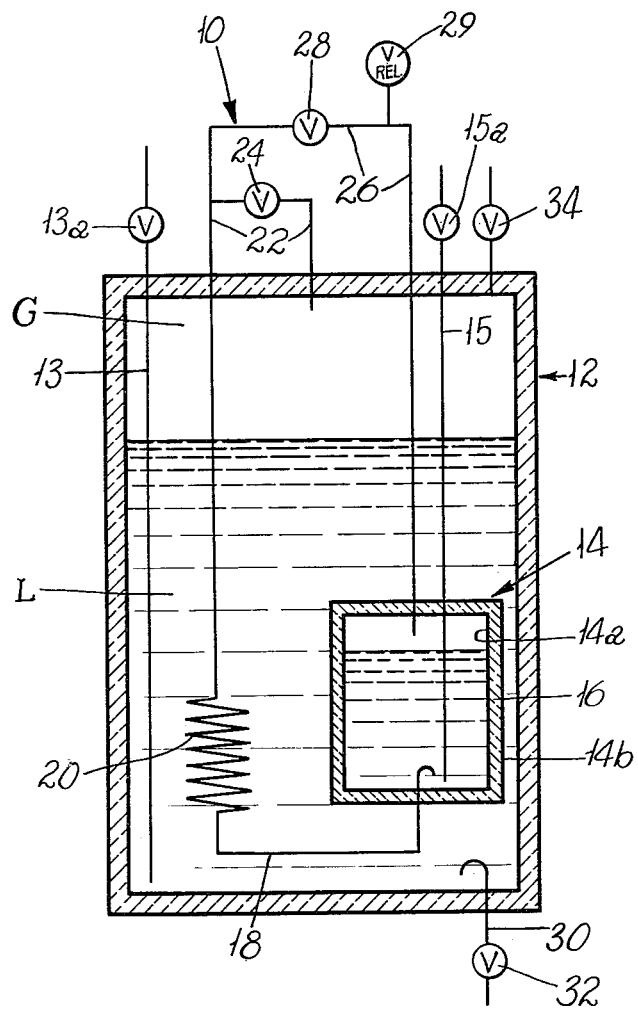

3,092,972
LIGHT WEIGHT LIQUID HELIUM
CONTROL SYSTEM
Richard M. Poorman and George C. Haettinger, Indianapolis, Ind., assignors to Union Carbide Corporation, a corporation of New York
Filed Oct. 22, 1958, Ser. No. 768,960
10 Claims. (Cl. 62—52)

This invention relates to air-borne equipment employing liquid helium as a source of pressurizing gas for fluid operated control systems and the like.

The weight problem embraces the most pressing and intense area of development in aircraft, missile, and rocket frontiers. A salient factor in this frontier is the mounting cost of carrying and the undesirably high weight loads of the standard operating equipment. Under the loads and stresses at which aircraft must operate, they are approaching the ultimate limits of present known power plants. Consequently, the full realization of aircraft power for peaceful and industrial uses cannot be gained without materials that are structurally light. This matter also has special urgency in this day of earth satellites.

To illustrate, a rule of thumb in the aircraft field is that each pound of aircraft weight requires an additional nine pounds of engine, air frame, and fuel to carry it. Since airplanes presently cost about $40 per pound, each pound of weight saved is an eventual saving of $400. In the missile field every pound saved allows an additional 5 miles of effective operating range.

Propelled by the economics of getting more equipment and/or service per pound from aircraft, the present invention makes a notable development in the weight reduction of aircraft parts, in particular the control system. This development is opening for the aircraft industry a whole new low cost field of controls, the principles of which are susceptible of application in other types of air-borne equipment.

According to the present invention, there is provided an aircraft control system which contributes to a vitally important weight reduction program in missiles and aviation. This is accomplished by providing a supply of liquid helium as a source of gas in fluid or gas-pressurized control systems in aircraft. When the helium is stored in liquid form, space and container weight can be substantially reduced. The result is a control system considerably smaller and lighter than standard control systems without sacrificing performance ability.

Previously used air-borne control systems employed hydraulic means for activating the control mechanism. It has also been proposed that pressurized gas be used as the control medium and that it be stored under high pressure. The weight saving in using a gas control medium in place of a liquid hydraulic medium is more than overcome by the undesirable weight of the heavy-wall high pressure storage vessels. The present invention employing liquid helium as the source of gas for operating control systems results in a considerable weight saving both in storage vessels and in valve and evaporator equipment as compared with these prior systems. The present invention even has advantages over a system employing liquid nitrogen as a source of control gas.

This invention will be more fully understood from the following table setting forth comparative data of a converter system utilizing liquid helium as a source of gaseous helium with respect to liquid nitrogen as the source of gas pressure. In this table the specific data referred to are merely for purposes of illustration. Values given are for the delivery of 1,000 cubic feet of gas at 70° F. and one atmosphere pressure.

| | Nitrogen system | Helium system | Helium system advantages |
|---|---|---|---|
| Lbs. liquid required. | 72.38 lbs | 10.3 lbs | Less weight. |
| Vol. liquid required at boiling point. | 1.43 cu. ft | 1.28 cu. ft | Less volume. |
| Thermal conductivity at −148° F. | .0095 B.t.u./hr. ft. ° F. | .012 | Will decrease converter heat exchanger size and weight. |
| Heat required to convert liquid to gas at 70° F. | 13,000 B.t.u | 6,280 B.t.u | Do. |
| Pressure drop in piping, heat exchangers, valves, etc., of same size. | 5 units | 1 unit | Will decrease converter heat exchanger size and weight as well as piping valves, etc. |
| Boiling point | −320° F | −452° F | |

From the above it will be seen that the weight of helium, one of the lightest of gases, is about one-seventh that of nitrogen. In addition, helium storage containers weigh about 11 percent less than nitrogen containers for supplying the same volume of gas due to the smaller volume of liquid helium required. Space and weight of heat exchanges, valves, and other parts are likewise materially less for a helium system than for an equivalent nitrogen system. Moreover, helium's high thermal conductivity, non-corrosive chemical properties, low gas density, plus its inert chemical activity, make it admirably suited for this service.

In the drawing the single FIGURE is a diagrammatic view illustrating the present invention in connection with a fluid or gas pressurized control system.

For simplicity the control system of the invention will be described in connection with a pressurized system for dispensing liquid oxygen. However, it is to be understood that the invention is not intended to be limited thereby, but is susceptible of other applications.

Referring to the drawing, a control system 10, embodying the principles of the invention and comprising a suitably insulated double-walled storage vessel 12 for holding a supply of liquid oxygen, is provided with a thin, double-walled liquid helium supply container or reservoir 14 made of stainless steel or the like. The helium container comprises an inner, thin-walled, pressure vessel 14a constructed to hold liquid helium at a desired working pressure of about 100 to 1000 p.s.i.g. The inner vessel 14a is jacketed by a larger gas-tight shell or outer vessel 14b, providing an intervening evacuable space filled with a high quality insulation 16 such as described in the copending application to L. C. Matsch, Serial No. 597,947, filed July 16, 1956. The liquid oxygen storage vessel 12 is provided with a liquid fill conduit 13 having a control valve 13a. A similar charging connection comprising a liquid fill line 15 and a control valve 15a communicates with the interior of the helium reservoir 14a.

In accordance with this invention the liquid helium reservoir 14 is disposed in thermal relation with the liquid oxygen, preferably immersed in the liquid oxygen space L, and provision is made for vaporizing the liquid helium and building up the helium gas pressure. The pressurized helium gas can then be used in a control system requiring gas for dispensing liquid oxygen from the storage vessel 12.

As a means of accomplishing this, helium in the liquid phase is withdrawn from reservoir 14 by a conduit 18 that is provided with a helical vaporization coil 20. The coil 20 absorbs sensible heat from the surrounding liquid oxygen so that as the liquid helium passes therethrough, it is evaporated and superheated to the conditions required for use. The gasified helium is fed to the gas space G in the vessel 12 by a conduit 22 controlled by a valve 24.

The evaporation of helium in coil 20 may occur at a pressure substantially lower than the pressure in the gas space G. To equalize these pressures, the conduit 22 has joined to it a line 26 having a pressure equalizing valve 28 for passing the pressurized helium into the top of the helium reservoir 14. When valve 28 is open, the equalization of pressures permits gravity flow of liquid helium to vaporizer 20 to generate gas at a pressure desired for use, such as for pressurizing the liquid oxygen. When the valve 24 is open, gaseous helium will flow through conduit 22 into the gas space G and provide the necessary pressure against the surface of the liquid oxygen to dispense it through a liquid oxygen discharge line 30 controlled by a valve 32. Connected to the gas space G in the storage vessel 12 is a relief valve 34 or other suitable gas discharge connection for automatically relieving excessive gas conditions in said vessel. A relief valve 29 in pressure equalizing line 26 serves to prevent helium gas pressure buildup in the helium reservoir 14.

Although the invention has been described in terms of the utilization of the gas for a fluid control system, it is not intended to limit it thereto. The invention is also useful as a means for pressurizing a fuel supply system as well as in other equipment employed in the aviation field and requiring gas pressure. An obvious advantage stemming from the use of liquid helium as a source for producing gas pressure for a control system is a substantial weight saving which could be applied to increasing the aircraft capacity, furnishing additionally needed equipment, or other useful purposes.

An important advantage derived from mounting the insulated helium container 14 in thermal contact with the liquid oxygen supply is that it reduces the temperature gradient across the insulation 16 of the helium container and more efficiently preserves the liquid helium from the effects of ambient heat.

It will be understood that modifications and variations may be effected, without departing from the spirit and scope of the invention.

What is claimed is:

1. A lightweight apparatus for air-borne equipment comprising a liquid oxygen vessel having a liquid oxygen space and a gaseous oxygen space, a thermally insulated liquid helium reservoir disposed within said vessel, a vaporizer coil in said vessel, a liquid helium line connection from said reservoir to said vaporizer coil, a gaseous helium line joined to said vaporizer coil and terminating in said gaseous oxygen space, and a liquid oxygen line in communication with said liquid oxygen space for dispensing liquid oxygen from said vessel.

2. A lightweight apparatus for air-borne equipment comprising a liquid oxygen vessel having a liquid oxygen space and a gaseous oxygen space, a thermally insulated liquid helium reservoir disposed within said vessel, a vaporizer coil in said vessel, a liquid helium line connection from said reservoir to said vaporizer coil, a gaseous helium line joined to said vaporizer coil and terminating in said gaseous oxygen space, a pressure equalizing gaseous helium conduit joining said gaseous helium line with helium reservoir, and a liquid oxygen line in communication with said liquid oxygen space for dispensing liquid oxygen from said vessel.

3. A fluid operated control system in an air-borne vehicle comprising a liquid oxygen vessel having a liquid oxygen space and a gaseous oxygen space, a thermally insulated liquid helium reservoir and a vaporizer coil therefor disposed within said vessel in thermal relation to said liquid oxygen space, a liquid helium line connection from said reservoir to said vaporized coil, a gaseous helium line joined to said vaporized coil and terminating in said gaseous oxygen space, and a liquid oxygen line in communication with said liquid oxygen space for dispensing liquid oxygen from said vessel.

4. A method of reducing the weight of an airborne fluid control system comprising containing a body of liquefied helium within the control system and partially insulating such body from the effects of ambient heat by surrounding the liquefied helium body with a body of a second low-boiling liquefied gas; and utilizing the liquefied helium as a source of gas pressure for said control system by converting said liquefied helium to gaseous helium by heat exchange with the second liquefied gas body within said control system at a temperature, pressure, and volume suitable for actuating said control system.

5. A method of pressurizing a liquefied gas control system comprising the steps of providing as a source of gas pressure in the control system, a body of liquefied helium; insulating said body of liquefied helium from the effects of ambient heat by immersing such body in a second body of said liquefied gas contained in a thermally insulated reservoir; withdrawing and vaporizing a portion of the liquefied helium by heat exchange with the second liquefied gas body; and contacting the vaporized helium with said control system so as to pressurize and discharge at least a part of such liquid from said reservoir.

6. A method of pressurizing a liquefied gas control system comprising the steps of providing as a source of gas pressure in the control system a body of liquefied helium; insulating said body of liquefied helium from the effects of ambient heat by immersing such body in a second body of said liquefied gas contained in a thermally insulated reservoir; withdrawing and vaporizing a portion of the liquefied helium by heat exchange with the liquefied gas second body; and contacting the vaporized helium with the upper end of said liquefied gas second body so as to discharge at least part of such liquid from said reservoir.

7. A light-weight apparatus for airborne equipment comprising a low-boiling liquefied gas storage vessel having a liquid space and a vapor space therein; a thermally insulated liquid helium reservoir disposed within said vessel; a vaporizer coil in said vessel; a liquid helium line connection from said reservoir to said vaporizer coil and terminating in said vapor space; and a low-boiling liquefied gas line in communication with said liquid space for dispensing the low-boiling liquefied gas from the vessel.

8. Apparatus according to claim 7 wherein the liquid helium reservoir is disposed within said liquid space.

9. Apparatus according to claim 7 wherein said vaporizer coil is disposed within said liquid space.

10. Apparatus according to claim 1 wherein said liquid helium reservoir and said vaporizer coil are disposed within said liquid oxygen space.

References Cited in the file of this patent

UNITED STATES PATENTS

| | | |
|---|---|---|
| 1,543,061 | Danielson | June 23, 1925 |
| 2,397,659 | Goddard | Apr. 2, 1946 |
| 2,482,778 | Joerren | Sept. 27, 1949 |
| 2,576,984 | Wildhack | Dec. 4, 1951 |
| 2,834,187 | Loveday | May 13, 1958 |
| 2,871,669 | Mann et al. | Feb. 3, 1959 |